Aug. 9, 1949.   J. N. KUZMICK   2,478,405
DEVICE FOR BONDING BRAKE LININGS TO BRAKE SHOES
Filed July 22, 1947   2 Sheets-Sheet 1

Inventor:
Joseph N. Kuzmick
By: Lee J. Gary
Attorney

Aug. 9, 1949. J. N. KUZMICK 2,478,405
DEVICE FOR BONDING BRAKE LININGS TO BRAKE SHOES
Filed July 22, 1947 2 Sheets-Sheet 2

Inventor:
Joseph N. Kuzmick
By: Lee J. Gary
Attorney

Patented Aug. 9, 1949

2,478,405

UNITED STATES PATENT OFFICE 2,478,405

DEVICE FOR BONDING BRAKE LININGS TO BRAKE SHOES

Joseph N. Kuzmick, Passaic, N. J., assignor to Raybestos-Manhattan, Inc., Passaic, N. J., a corporation of New Jersey Application July 22, 1947, Serial No. 762,653

5 Claims. (Cl. 154—1)

This invention relates to improvements in a device for securing a brake lining to the face of a brake shoe and refers specifically to a device for applying heat to the brake shoe to cause the setting of a heat-sensitive adhesive interposed between the face of the shoe and the brake lining while said lining is held upon the face of the brake shoe under pressure.

The objects and advantages of my invention will be apparent from the accompanying drawings and following detailed description.

Figure 1:
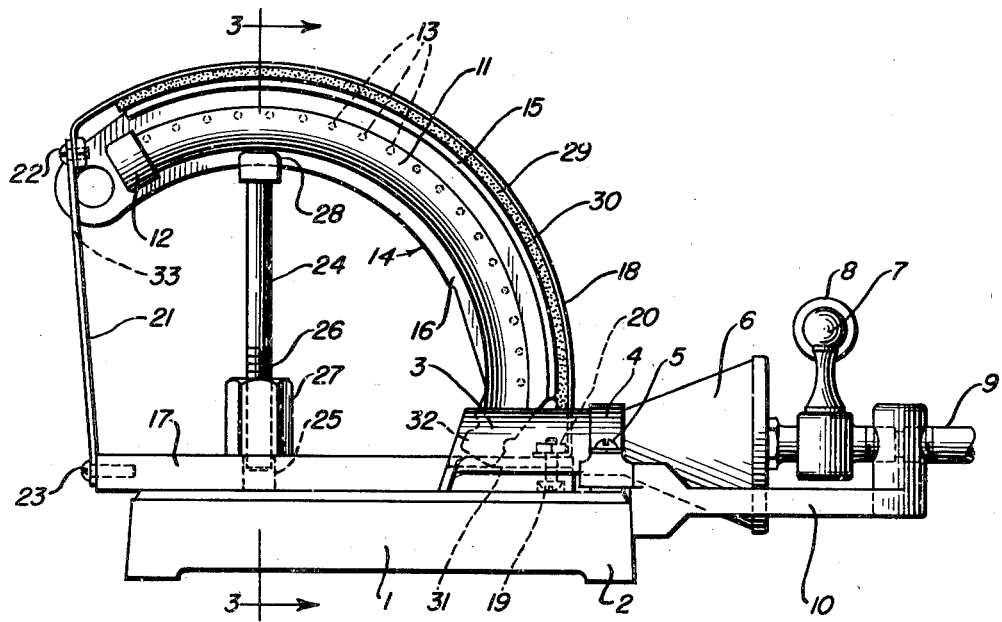
Fig. 1 is a slide elevational view of my device having a brake shoe and lining in operative position thereon.

Referring in detail to the drawings, 1 indicates a supporting platform having feet 2. A pair of headers 3 are mounted upon the upper surface of the platform 1 adjacent one edge thereof, and are secured to said platform by means of a strap 4 which embraces both headers and is anchored to the platform by means of screws 5. The opposite end of each header 3 is secured with a mixing chamber 6 which is of the usual type employed with conventional gas burning appliances to control the proportions of combustible gas and air fed to the gas burning appliance. Associated with each of the mixing chambers 6 is a shutoff or control valve 7 manipulated by handles 8, the valves 7 serving to control the passage of gas through pipes 9 to headers 3, pipes 9 being connected to a suitable source of combustible gas (not shown). Brackets 10 mounted upon platform 1 support valves 7 and chambers 6.

A curved burner pipe 11 connects at one end to each header 3 and is closed at its opposite end by means of a cap 12 or other closure means. The pipe 11 is curved on a radius of curvature which generally conforms to the radius of curvature of the average automobile brake shoe and has an arcuate length conforming generally to the average arcuate length of the average brake shoe adapted to be operated on by the device.

As has been hereinbefore described, the headers 3 are mounted upon the platform 1 in spaced relationship. Similarly, the pipes 11 are disposed in spaced relationship and are positioned parallel to each other. Adjacent the convex portion of each of the pipes and disposed inwardly with respect to the vertical center line of each of the pipes, a row of spaced burner apertures 13 are provided. As will be hereinafter more fully described, a brake shoe carrying a brake lining to be secured to the face of the shoe is adapted to be positioned between the spaced pipes 11.

Figure 4:
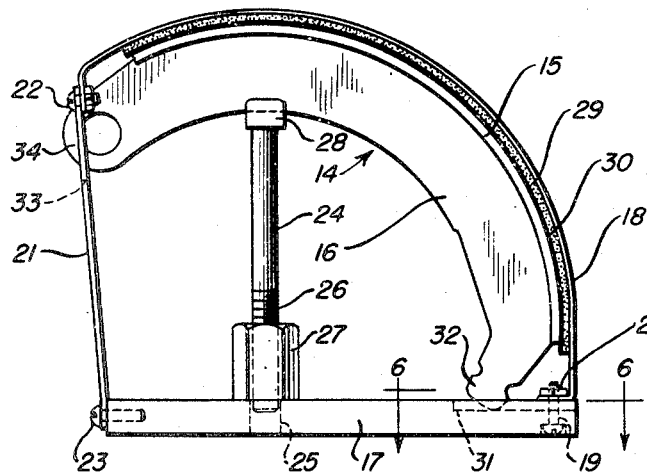
Fig. 4 is a side elevational view of a brake shoe and lining embraced by a clamp.

Referring particularly to Fig. 4, a brake shoe 14 having an arcuate flange or working face 15 and a web or rib 16 is positioned upon a base 17 which may be constructed of metal or wood. An arcuate strap 18 of spring metal is secured at one end to the base 17 by means of bolts 19 having threadedly engaged nuts 20. At the opposite end the strap 18 is joined to a second strap 21 by means of bolts 22 and strap 21 is anchored at its opposite end to the end of base 17 by means of screws 23. A screw 24 is positioned in an aperture 25 in base 17, said screw being provided with threads 26 which are engageable with the internal threads of nut 27. The opposite end of screw 24 has a slotted or bifurcated head 28 which, when the brake shoe 16 is mounted upon base 17, engages the edge of web or rib 16.

To mount an arcuate brake lining 29 upon the flange or working face 15 of the brake shoe 14 a heat responsive, preferably a heat setting adhesive 30 is interposed between the working face 15 and the concave face of the lining 29. The adhesive 30 may take the form of a phenolic cement, resin treated paper or asbestos, resin treated scrim or cheese cloth or the like.

Figure 5:
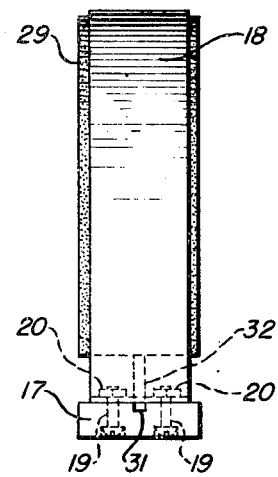
Fig. 5 is an end elevational view of the device illustrated in Fig. 4.
Figure 6:
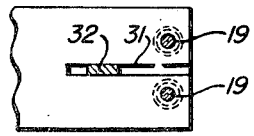
Fig. 6 is a fragmentary sectional view taken on line 6—6 of Fig. 4.

With the lining 29 preliminarily positioned upon the flange 15 with the adhesive interposed, the shoe 14 may be positioned upon base 17. To facilitate centering the shoe upon the base a slot 31 may be provided in the face of the base into which an end 32 of the web 16 may be positioned. The shoe 14 is positioned beneath strap 18 and said strap conforms to and engages the outer face of the lining 29, as shown best in Figs. 4 and 5. An aperture 33 may be provided in strap 21 through which end 34 of the web 16 may project.

With the shoe in the position described, the nut 27 is manipulated to project screw 24 toward the web 16 thereby causing strap 18 to exert uniform pressure over the major portion of the lining 29.

Figure 2:
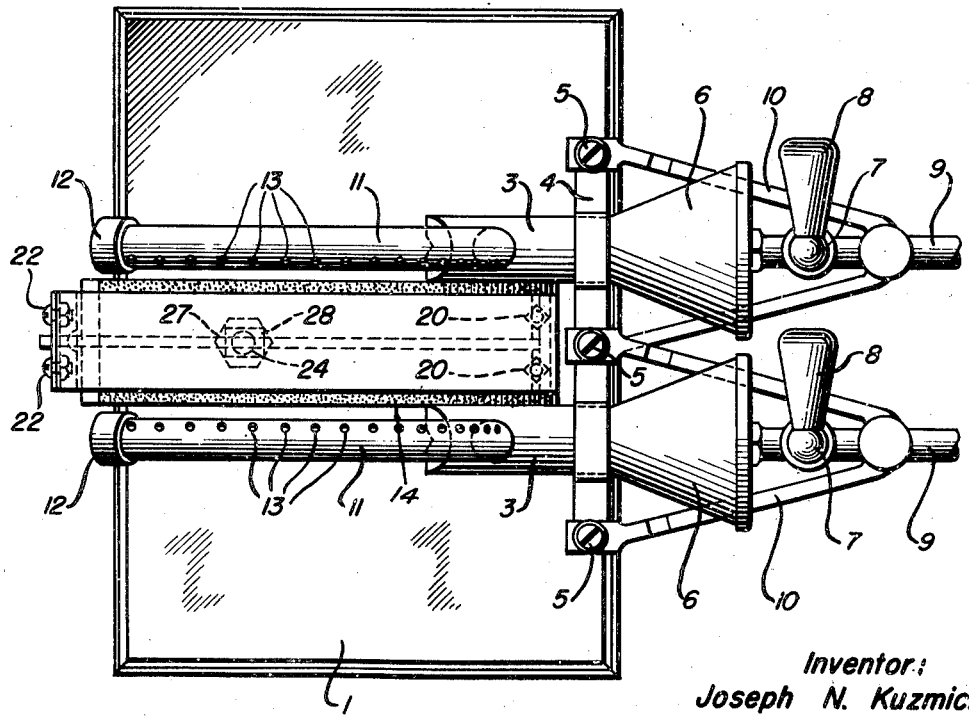
Fig. 2 is a top plan view of the device shown in Fig. 1.
Figure 3:
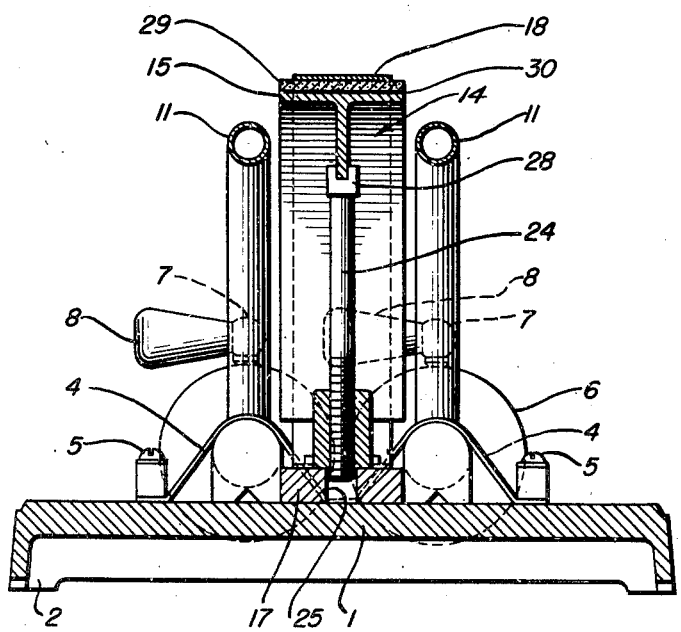
Fig. 3 is a sectional view taken on line 3—3 of Fig. 1.

The shoe 14, clamped as hereinbefore described is then positioned between the pipes 11, as shown best in Figs. 1, 2 and 3, the pipes conforming more or less to the curvature of the flange 15 and being positioned below and slightly offset from the lateral edges of said flange. The gas may be turned on and lighted at the apertures 13 whereby a plurality of flames will be directed to the lower face of the flange 15. The flange 15, being constructed of metal, will readily conduct the heat of the flames to the adhesive which will function to secure the lining 29 while held under pressure to the flange 15. I have found that an average size brake lining for a passenger automobile may be secured to a brake shoe during a heating period of two minutes or less using my present device.

It is to be understood that other expedients for clamping the brake lining to the flange 15 may be employed, and my device may be constructed in multiple, that is, three pipes 11 may be employed to heat two brake shoes simultaneously or four pipes may be used to heat three shoes simultaneously and so on, in which case all but the endmost pipes will be provided with double rows of apertures 13. Other obvious changes may be made by anyone skilled in the art and, hence, I do not wish to be limited except as necessitated by the prior art.

I claim as my invention:

1. A device for securing an automotive brake lining to a brake shoe, which comprises a pair of spaced arcuate manifolds between which an arcuate brake shoe carrying a brake lining on its outer face is adapted to be positioned, means connecting said manifolds to a source of combustible gas, each of said manifolds being provided with a plurality of apertures whereby gas flames are directed to the inner face of said brake shoe to set an adhesive adapted to be interposed between the brake lining and outer face of the brake shoe, and means for retaining the brake lining on the outer face of the brake shoe under pressure during the setting operation.

2. A device for securing an automotive brake lining to a brake shoe, which comprises a pair of spaced arcuate manifolds between which an arcuate brake shoe carrying a brake lining on its outer face is adapted to be positioned, means connecting said manifolds to a source of combustible gas, each of said manifolds being provided with a plurality of apertures adjacent the convex sides of said manifolds whereby gas flames are directed to the inner face of said brake shoe to set an adhesive adapted to be interposed between the brake lining and outer face of the brake shoe, and means for retaining the brake lining on the outer face of the brake shoe under pressure during the setting operation.

3. A device for securing an automotive brake lining to a brake shoe, which comprises a pair of spaced arcuate manifolds between which an arcuate brake shoe carrying a brake lining on its outer face is adapted to be positioned, means connecting said manifolds to a source of combustible gas, each of said manifolds being provided with a plurality of apertures adjacent the convex inner sides of said manifolds whereby gas flames are directed upwardly and inwardly toward the inner face of said brake shoe to set an adhesive adapted to be interposed between the brake lining and outer face of the brake shoe, and means for retaining the brake lining on the outer face of the brake shoe under pressure during the setting operation.

4. A device for securing an automotive brake lining to a brake shoe, which comprises a pair of spaced arcuate manifolds between which an arcuate brake shoe carrying a brake lining on its outer face is adapted to be positioned, means connecting said manifolds to a source of combustible gas, air mixing valves interposed in said connecting means to form a burnable gas mixture entering said manifolds, each of said manifolds being provided with a plurality of apertures whereby gas flames are directed to the inner face of said brake shoe to set an adhesive adapted to be interposed between the brake lining and outer face of the brake shoe, and means for retaining the brake lining on the outer face of the brake shoe under pressure during the setting operation.

5. A device for securing an automotive brake lining to a brake shoe, which comprises a pair of spaced arcuate manifolds between which an arcuate brake shoe carrying a brake lining on its outer face is adapted to be positioned, means connecting said manifolds to a source of combustible gas, each of said manifolds being provided with a plurality of apertures whereby gas flames are directed to the inner face of said brake shoe to set an adhesive adapted to be interposed between the brake lining and outer face of the brake shoe, and tension means positioned over the outer face of the brake lining for retaining the inner face of the brake lining in intimate contact with the outer face of the brake shoe during the adhesive setting operation.

JOSEPH N. KUZMICK.

REFERENCES CITED

The following references are of record in the file of this patent:

UNITED STATES PATENTS

| Number | Name | Date |
|---|---|---|
| 393,022 | Milledge | Nov. 20, 1888 |
| 802,876 | O'Connor et al. | Oct. 24, 1905 |
| 916,209 | Smallwood | Mar. 23, 1909 |
| 2,358,483 | Tilden | Sept. 19, 1944 |
| 2,426,421 | Tilden et al. | Aug. 26, 1947 |
| 2,433,760 | Janes | Dec. 30, 1947 |
| 2,444,191 | Friberg | June 29, 1948 |